US007400711B1

(12) United States Patent
Ford et al.

(10) Patent No.: US 7,400,711 B1
(45) Date of Patent: Jul. 15, 2008

(54) SYSTEM AND TECHNIQUE FOR DYNAMICALLY INTERJECTING LIVE ADVERTISEMENTS IN THE CONTEXT OF REAL-TIME ISOCHRONOUS (TELEPHONE-MODEL) DISCOURSE

(75) Inventors: Daniel A Ford, Los Gatos, CA (US); Reiner Kraft, Gilroy, CA (US); Gaurav Tewari, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1329 days.

(21) Appl. No.: 09/513,646

(22) Filed: Feb. 25, 2000

(51) Int. Cl.
  *H04M 1/64* (2006.01)
  *H04M 15/00* (2006.01)
  *H04N 7/025* (2006.01)
(52) U.S. Cl. .................. 379/70; 379/114.13; 725/34
(58) Field of Classification Search ............ 379/114.13, 379/114.12, 114.1, 88.01, 88.04, 88.07, 88.11, 379/88.13, 88.22; 725/42–47
  See application file for complete search history.

(56) References Cited

U.S. PATENT DOCUMENTS

| 5,195,031 | A * | 3/1993 | Ordish ........................ 705/37 |
| 6,351,279 | B1 * | 2/2002 | Sawyer .................... 379/93.17 |
| 6,606,644 | B1 * | 8/2003 | Ford et al. .................. 709/203 |
| 6,615,175 | B1 * | 9/2003 | Gazdzinski ................. 704/275 |
| 2001/0022788 | A1 * | 9/2001 | Matsubara et al. .......... 370/462 |
| 2003/0135853 | A1 * | 7/2003 | Goldman et al. ............. 705/14 |

FOREIGN PATENT DOCUMENTS

| JP | 2000039804 A | * | 2/2000 |
| JP | 2002271507 A | * | 9/2002 |
| KR | 2002007780 A | * | 1/2002 |
| KR | 2002024909 A | * | 4/2002 |

* cited by examiner

*Primary Examiner*—Fan Tsang
*Assistant Examiner*—Joseph T Phan
(74) *Attorney, Agent, or Firm*—Delio & Peterson, LLC; Leonard T. Guzman

(57) ABSTRACT

A method, system and program storage device are provided for interjecting messages into a real-time isochronous discourse (such as a telephone call) between a plurality of callers wherein the method, system and device accesses the call between the callers, monitors the discourse to determine if the discourse relates to a system message desired to be communicated to the caller, chooses and communicates the system message to the callers when the discourse is determined to be relevant to the system message and continues the above accessing, monitoring and communicating steps until the call being accessed between the callers is terminated. The interjected messages are primarily related to advertising and can be introduced to one or more callers, or, separate messages in different languages can be introduced to one or more callers depending on the caller's accessing the telephone. Caller subscribers of the system will typically have the cost of the call partly or totally subsidized by the method and system.

13 Claims, 2 Drawing Sheets

SYSTEM AND TECHNIQUE FOR DYNAMICALLY INTERJECTING LIVE ADVERTISEMENTS IN THE CONTEXT OF REAL-TIME ISOCHRONOUS (TELEPHONE-MODEL) DISCOURSE

BACKGROUND OF THE INVENTION

1. Field of the Invention

The present invention relates to interjecting messages into a real-time isochronous discourse between a plurality of users and, more particularly, to interjecting advertising messages into phone conversations with the advertisements being directed to the subject matter of the conversation.

2. Description of Related Art

The seminal importance of the telephone as a generalized communication medium has been clear from the very outset. In contrast to the Internet, which is an asynchronous (random delay) communication media, the telephone is an isochronous (fixed delay) channel. What this means is that while the latency of a given packet of information on the Internet is random, and could (potentially) be infinite, the latency in the telephone-model is predetermined and fixed. In the telephone model, fixed latency is desirable because information is generally sent in regulated streams of data (as opposed to random bursts), and because the conversation is live, and thus dependent upon smooth flow and continuity.

Despite the popularity of real-time communication using the telephone-model, the implications of this paradigm for dynamic and automated commercial advertising purposes have largely been overlooked. Most advertising using the telephone model takes the form of telemarketing or soliciting customers by explicitly placing personal (or, in some cases, prerecorded) calls to them. Current day advertising using the telephone-model typically involves calling a random sample of potential consumers, chosen probabalistically from some set, and presenting them with an advertisement of premeditated content and form. This is a crude, non-scalable, and an expensive approach of questionable efficacy.

Efforts have been made to somewhat alter how the advertising is presented so as to increase its relevance to the telephone caller. The most notable example of this is the case of "hold" recordings. Often upon calling a company, the caller is placed "on hold" for a certain amount of time, until a service representative becomes available. During the time the caller is "holding" he or she may be exposed to prerecorded audio advertisements which attempt to inform the caller about the organization, the scope of its operations, and about specific product offerings that the user is likely to be interested in. For example, a person calling an airline for ticket reservations when put on hold will be told about "hot airfare deals" while he or she is waiting for an agent to personally service their request. Such rate information is likely to be of interest to the caller who, presumably, is calling to buy an airline ticket.

Bearing in mind the problems and deficiencies of the prior art, it is therefore an object of the present invention to provide a method for interjecting messages into a real-time isochronous discourse between a plurality of users.

It is another object of the present invention to provide a method for interjecting advertising messages into telephone conversations which advertising messages are specifically directed to the subject of the conversation.

A further object of the invention is to provide a system for interjecting messages into a real-time isochronous discourse between a plurality of users.

It is yet another object of the present invention to provide a system for injecting advertising messages into telephone conversations which messages are specifically directed to the subject of the conversation.

It is an additional object of the present invention to provide a program storage device readable by a machine, tangibly embodying a program of instructions executable by the machine to perform method steps for interjecting messages into a real-time isochronous discourse between a plurality of users.

It is another object of the invention to provide a program storage device readable by machine, tangibly embodying a program of instructions executable by a machine to perform method steps for interjecting advertising messages into telephone conversations which advertising messages are specifically directed to the subject of the conversation.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of interjecting messages into a real-time isochronous discourse between a plurality of users comprising providing a system for accessing a real-time isochronous discourse between two or more callers; accessing a real-time isochronous discourse between two or more callers with the system; monitoring the discourse between the callers to determine if the discourse relates to a message desired to be communicated to the callers by the system; and communicating the desired message to the callers when the discourse is determined to be related to the desired message. Preferably, the real-time isochronous discourse is a telephone call, and the method steps are continued until the discourse being accessed is terminated by the callers or the system.

In a related aspect, the present invention provides a method of interjecting messages into a real-time isochronous discourse between a plurality of users comprising the steps of:

providing a system for accessing a real-time isochronous discourse between two or more callers;

accessing a real-time isochronous discourse, e.g., a telephone call, between two or more callers;

monitoring the discourse between the callers to determine if the discourse relates to a message desired to be communicated to the callers by the system;

communicating the desired message to the callers when the discourse is determined to be related to the desired message; and continuing the above steps until the discourse, e.g., telephone call, being accessed is terminated by the callers or the system.

In an additional aspect, the invention is directed to a system for interjecting messages into a real-time isochronous discourse between a plurality of users comprising:

means for accessing a real-time isochronous discourse between two or more callers;

means for monitoring the discourse between the callers to determine if the discourse relates to a message desired to be communicated to the callers by the system; and means for communicating the desired message to the callers when the discourse is determined to be related to the desired message.

In a further aspect the invention is directed to a program storage device readable by a machine, tangibly embodying a program of instructions executable by the machine to perform method steps for interjecting messages into a real-time isochronous discourse between a plurality of users comprising the steps of:
provided a system for accessing a real-time isochronous discourse between two or more callers;
accessing a real-time isochronous discourse, e.g., a telephone call, between two or more callers;
monitoring the discourse between the callers to determine if the discourse relates to a message desired to be communicated to the callers by the system;
communicating the desired message to the callers when the discourse is determined to be related to the desired message; and
continuing the above steps until the discourse, e.g., telephone call, being accessed is terminated by the callers or the system.

In another aspect of the invention a method of interjecting messages into a real-time isochronous discourse between a plurality of callers is provided comprising the steps of: forming a system comprising:
a system interface for inputting and storing system parameters by the owner of the system;
a communication media interface for communicating with an isochronous communication system being used by two or more callers;
a conversation content analyzer and summarizer for determining if the communication between the callers is relevant to the system parameters;
a database for storing system data including system messages to be transmitted to the callers;
a database manager for matching system parameters with the communication between the callers; and
a caller interface for communicating the system data and/or messages to one or more of the callers;
accessing the isochronous communication system being used by two or more callers using the communication media interface;
monitoring the communication between the callers using the communication media interface;
analyzing the conversation using the conversation content analyzer and summarizer;
determining if there is a match between the conversation and one or more of the system parameters using the database manager;
sending the system data from the database to the database manager if there is a match and choosing a suitable message from the database for communication to the callers; and
transmitting the message to the callers using the caller interface.

In another aspect of the invention a system is provided for interjecting messages into a real-time isochronous discourse between a plurality of callers comprising:
means for forming a system comprising:
a system interface for inputting and storing system parameters by the owner of the system;
a communication media interface for communicating with an isochronous communication system being used by two or more callers;
a conversation content analyzer and summarizer for determining if the communication between the callers is relevant to the system parameters;
a database for storing system data including system messages to be transmitted to the callers;
a database manager for matching system parameters with the communication between the callers; and
a caller interface for communicating the system data and/or messages to one or more of the callers;
wherein the isochronous communication system being used by two or more callers is accessed using the communication media interface; the communication between the callers is monitored using the communication media interface; the conversation is analyzed using the conversation content analyzer and summarizer; and the conversation is compared with one or more of the system parameters using the database manager and, if there is a match, sending the system data from the database to the database manager and choosing a suitable message from the database for communication to the callers and transmitting the message to the callers using the caller interface.

In another aspect the invention is directed to a program storage device readable by a machine, tangibly embodying a program of instructions executable by the machine to perform a method of interjecting messages into a real-time isochronous discourse between a plurality of callers comprising the steps of:
forming a system comprising:
a system interface for inputting and storing system parameters by the owner of the system;
a communication media interface for communicating with an isochronous communication system being used by two or more callers;
a conversation content analyzer and summarizer for determining if the communication between the callers is relevant to the system parameters;
a database for storing system data including system messages to be transmitted to the callers;
a database manager for matching system parameters with the communication between the callers; and
a caller interface for communicating the system data and/or messages to one or more of the callers;
accessing the isochronous communication system being used by two or more callers using the communication media interface;
monitoring the communication between the callers using the communication media interface;
analyzing the conversation using the conversation content analyzer and summarizer;
determining if there is a match between the conversation and one or more of the system parameters using the database manager;
sending the system data from the database to the database manager if there is a match and choosing a suitable message from the database for communication to the callers; and
transmitting the message to the callers using the caller interface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which.

DESCRIPTION OF THE PREFERRED EMBODIMENT(S)

Figure 1:
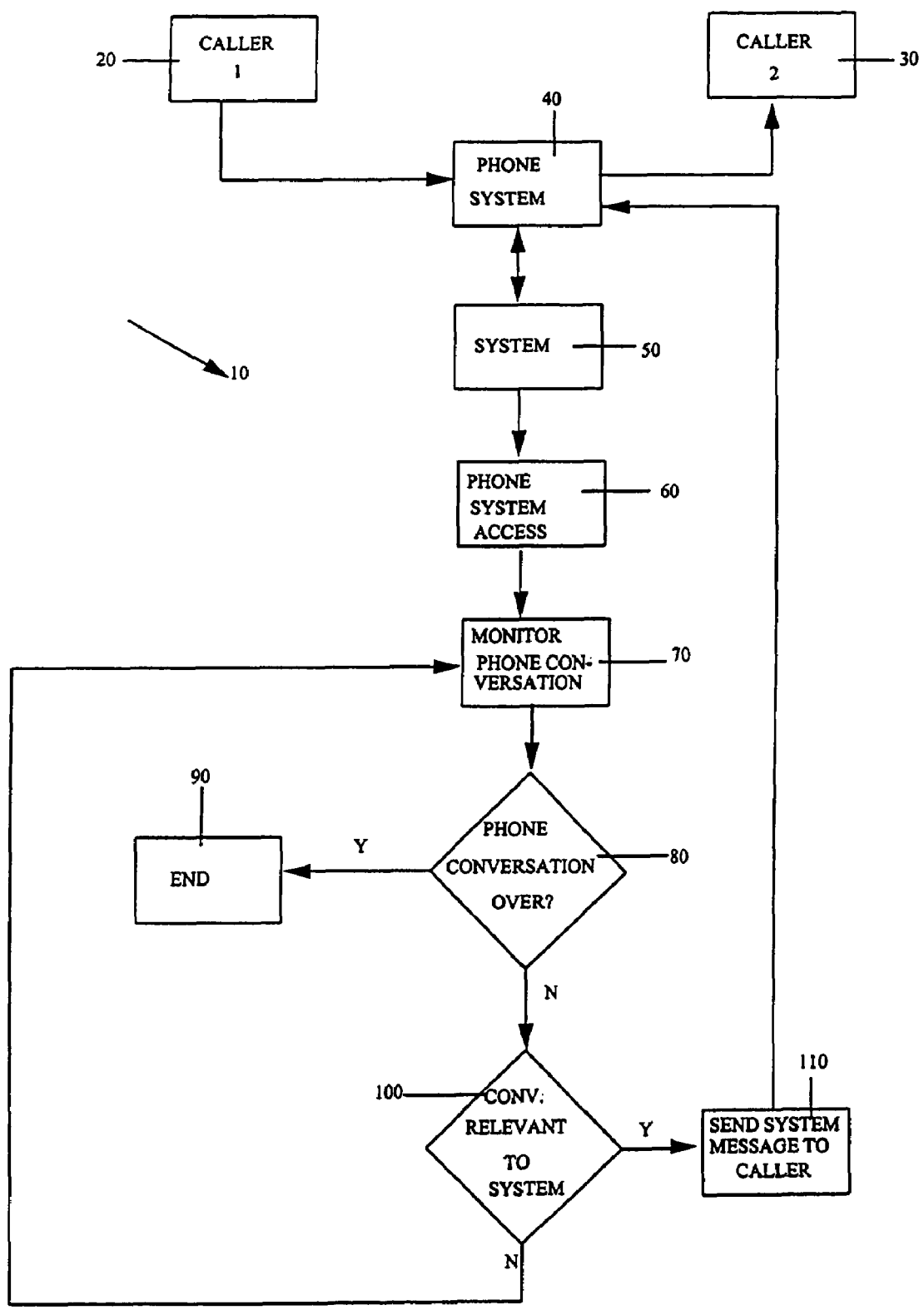
FIG. 1 is a flow diagram of a method and system of the invention.

In describing the preferred embodiment of the present invention, reference will be made herein to FIGS. 1 and 2.

The method and system of the invention offers a novel and extremely exciting opportunity to telephone (e.g., real-time isochronous systems) advertisers and merchants.

By superimposing an additional system layer upon the currently existing telephone infrastructure, and by using currently existing speech recognition technologies, the method and system of the invention will be able to monitor the conversation being held in any given telephone conversation, or any other such form of real-time isochronous communication.

Specifically, based upon the system owner's inputting and storing system parameters, the system will access a telephone conversation between one or more callers and look for a match between system parameters and the conversation, e.g., the temporally contiguous occurrence of a particular keyword or set of keywords. The appearance of such keywords would be used to infer the general topic or subject of the conversation between the callers. Once the general subject area of the conversation has been (probabalistically) deduced, the system will interject (e.g., audio) advertisements in the conversation that actually match the theme of the conversation, thus eliciting greater attention and interest from the callers. In a preferred embodiment, the system can be configured (programmed) to converse personally with each individual caller participating in the conversation, and present a different message to each caller. This concept is especially relevant in the context of conference calls, in which multiple people can be participating in the same conversation.

For example, a sudden occurrence of keywords in the conversation such as "car", "automobile", "drive", "convertible", "coupe", etc., which, if matching system parameters, will signal to the system that now is an opportune time to present an audio clip advertising a special sale on cars and particularly convertibles. From the point of view of the human participants in the conversation, the advertisement will be of greater relevance at the particular moment, and they will be motivated to pay greater attention to the advertisement. Moreover, since the system may be configured to be aware of the geographical location of each participant in the telephone conversation (such information is readily available by merely tracing the participant's telephone number, and looking up the number to exact geographical location conversation in a hashtable), the system will be able to present very specific advertisements, that will be particular to the participant's geographical locale. For instance, consider a telephone call placed from San Jose, Calif. (United States) to Cairo, Egypt. If in the context of this call, as described above, the system detects an opportune time window to interject an audio clip describing a special sale for, say, computers, then the call participant in the United States will be given information about the weekend sale at a local electronics store in San Jose which is a subscriber to the system, while the participant in Egypt will receive information about the computers available through an electronics store in downtown Cairo likewise being a subscriber to the system. Optionally the system may even be configured to present advertising in multiple languages, if desirable. For instance, the caller participant in Egypt may be exposed to an audio clip in Arabic.

The owner or operator of the system would merely need to specify system parameters such as sets of keywords, typically sequence dependent, to be detected in the context of the conversation and intended to be matched to trigger interjecting advertisements into the telephone conversation. For convenience the term "owner" will be used but it will be appreciated that the term applies to one who owns, operates, leases, or otherwise controls the system. The term "caller" will be used to indicate the user or participant of the system, typically the caller.

Other system parameters to be specified by the owner of the system will vary widely depending on how the system is to be used, how the caller will access the system, whether the caller will be reimbursed for using the system, etc. and will include parameters such as subscriber names, subscriber telephone numbers, prefix digits to be used by the caller to access the system, advertisement text, how the advertisements are to be presented to particular subscribers, and updating of all the above parameters to maintain the system current. The use of the above parameters by the system will be further described hereinbelow but it should be understood that any number of parameters can be used depending on how the system is to be used with the system essentially providing access to a real-time isochronous discourse between two or more callers which discourse is monitored and when the discourse is determined to relate to a message desired to be communicated to the callers by the system, the desired message is communicated and the above procedure is continued until the telephone call being accessed is terminated.

A major benefit that the method and system of the invention provides is that advertising revenue may be used to subsidize the cost of any given telephone call. In fact, it is envisioned that all telephone calls will be completely free to the call participants with the cost covered wholly by the advertiser if the call participants are system members. System members would agree that their calls be accessed and monitored and interrupted in return for a reduced (or no cost) calling rate.

In preferred embodiments of the invention, video-phones and video-conferencing tools may be used for interjecting not just audio but video and other multimedia advertisements as well.

In one embodiment, the system member (caller) initiating the call (from a known and specified telephone number) will explicitly give the owner of the system permission to interject advertisements in his or her telephone calls. This could be done on a subscription basis as noted above or on a per-call basis. For instance, the caller could pre-dial some sequence of digits (such as: 10-10-9999), and then the desired number of the person he or she wishes to call. Dialing this sequence of prefix digits will automatically route the call through the system of the invention so that the system is able to access and monitor the call and interject advertisements as desired. The incentive to the caller will be that the advertising revenues with the interjected advertisements will be used to heavily subsidize or perhaps even completely cover the cost of the call.

The invention basically involves adding an additional layer of functionality upon the framework already embodied by the pervasive telephone-model infrastructure.

The preferred system embodiment of the present invention comprises the following components:

1. Owner Interface (OI)
2. Communication Media Interface (CMI)
3. Conversation Content Analyzer and Summarizer (CCAS)
4. Database Manager (DM)
5. Caller Interface (CI)

The Owner Interface (OI) represents the software component within the system which will directly interact with the owner or operator of the system. Interactions between the owner and the system are mediated by the OI.

The OI is responsible for getting configuration parameters directly from the owner and propagating these to the Communication Media Interface (CMI). The operation of the OI requires that the owner specify sufficient system parameters so that the system is able to access, monitor, index and summarize the owner information and be able to identify which telephone conversation to monitor. Thus, for example, in the case of a telephone call, the owner might have to specify which telephone numbers (say, telephone numbers that originate a given call) he or she is interested in, so that the system knows where to look for the relevant data.

If, for instance, the caller (participant) is expected to input some set of prefix digits with the desired phone numbers to invoke and access the system and route his or her call through the system, then the OI must be given parameters which will instruct the system to, among others, appropriately determine accessing the call; to route the call, extract the geographical locale of the origination and destinations points, and appropriately charge or subsidize the call cost.

The OI also preferably prompts the owner to specify keywords or sets of keywords for matching with the conversation between the callers, and passing these on to the Conversation Content Analyzer and Summarizer (CCAS). Additionally, the OI must be given a database of candidate advertisements, and a mapping specified by the owner between keywords and advertisements or sets of advertisements. The OI will index all available advertisements in a back-end database, and will inform (communicate with) the Database Manager (DM) of the contents of this database as well as of the mapping between keywords and advertisements. Given the state of current technology, and the fact that virtually all telephone calls are audio only, advertisements will largely take the form of audio presentations. However, it should be noted that the general concept presented here can be extended to incorporate advertisements of any form desired by the user (such as image banners or video streams, in addition to, or instead of, audio presentations), provided that the technology required to interject these in the context of real-time isochronous discourse exists and is implementable.

Optionally, the mapping in the DM can be extended to incorporate locale specific advertisements, with different languages associated with each locale, and also be configured to conform to socio-cultural norms (for instance, it may be inappropriate to advertise cigarettes to underage children, etc.).

The Communication Media Interface (CMI) is a software component that will link the system with the currently existing telephone-model communication medium. All interactions between the system and the telephone communication infrastructure are mediated by the CMI. Using the CMI, and the owner-specified parameters obtained from the Owner Interface (OI), the system will configure the operation of the system. In addition to configuring the system with the appropriate parameters, the CMI is responsible for collecting the data being exchanged in the real-time discourse and propagating this into the Conversation Content Analyzer and Summarizer (CCAS).

The Conversation Content Analyzer and Summarizer (CCAS) is a software component which is responsible for dynamically analyzing the content of the discourse being conducted in real-time in the isochronous communication system being used by the callers.

In the context of audio-based isochronous communication media (such as current day telephones) the CCAS will analyze the content of the conversation and check for the occurrence of system parameter keywords or sets of ordered keywords by using speech recognition technology. The CCAS will thus check for the occurrence of owner (system) specified keywords in the telephone conversation that the CCAS analyzes. Based upon a partial or complete match with one or more sets of owner-specified keywords, the CCAS will determine the probability that the discourse or discourse fragment in question is of relevance. If the deduced probability is above some owner-specified threshold, a "Discourse Snippet" (DS) will be "marked" and passed on to the Database Manager (DM), along with a list of the keywords or sets of keywords that it was found to have matched. The exact length of the DS, which is the context in which keywords were identified, can be defined by the owner and specified via the OI.

The Database Manager (DM) is a software component of the system that actually determines which advertisement should be relayed to the caller in response to a particular message being exchanged in real-time between callers, which matches the owner's specifications. The DM maintains a user-specified mapping between keywords and advertisements. In the event that a given keyword maps to multiple advertisements, the DM is free to pick randomly amongst the candidates. Alternatively, the owner may choose to specify a ranking amongst the acceptable candidates, or may wish to impose special conditions, such as requiring that a round-robin scheduling be followed so as to avoid needless repetition, etc. Furthermore, the owner may optionally incorporate geographical locale specific constraints into the keyword to advertisement mapping. Such constraints might include, for instance, the ability to prefer advertisements in different languages, and advertisements which show sensitivity towards socio-cultural factors.

Once the DM has selected an acceptable advertisement, the DM will retrieve it from the back-end database, and pass it on to the Caller Interface (CI), along with user Ids (UIDs) that uniquely identify the people believed to be participating in the conversation of interest. A simple UID, for instance, may simply be the person's phone number.

In order to be able to identify conversation participants and accurately infer the theme of the conversation, the DM will need to actually "follow" the sequence and continuity of a prolonged conversation on a similar theme. The DM will accomplish this by remembering the UIDs of speakers of juxtaposed messages (i.e. message occurring in sequence, one after the other) which match the same keywords. The fact that sequential messages match the same keywords will be taken to indicate that these messages are related, and hence part of the same conversation.

The Caller Interface (CI) is the component of the system which forms the link between the system and the real-time communication channel the system is monitoring. The CI is responsible for actually presenting the advertisement to the caller, the human participant within the isochronous communication channel. Depending on the owner's specifications (system parameters), the CI can be configured to either broadcast the advertisement to all the participants in the conversation, multicast it to a subset of callers actually participating in the conversation of interest (this list of users (UIDs) is presented to the CI by the DM), or unicast the message to a particular caller.

Also, using the information it has received from the DM, the CI can present the advertisement in an extremely customized, personalizable and interactive manner. For instance, lets say Bob is a participant in a conversation in which the keywords "linux", "windows", "operating systems", "software", "application", etc. have been detected. As such, the CI may now present Bob with a personal message that contains an advertisement for Red Hat Linux products, and which states something like "Hi Bob, I felt you might be interested in this!"

In addition, the CI may also offer to send Bob a personalized email, with more detailed information about the merits of Red Hat products. The fact that the participants name is Bob may either be obtained by tracing the phone number by prompting the callers to enter some personal information, either one time when they "subscribe" to the system, or every time they wish to use the system to make a phone call", inputting the subscriber names by the owner, etc.

Referring now to the figures, FIG. 1 shows a system and method of the invention generally as 10. In operation, the caller 1 in step 20 would use phone system 40 to call caller 2 in step 30. The system of the invention 50 interfaces with the phone system 40 and the call between caller 1 and caller 2 is accessed by the system in step 60. The phone conversation is monitored in step 70 to determine what the conversation is about and compares words in the conversation with system defined words to determine if there is a match between the word and the desired system words so that an advertisement would be sent to the callers. Firstly, while the phone conversation is being monitored in step 70, step 80 determines whether or not the phone conversation is continuing or if it has been terminated. If the phone conversation in step 80 has been terminated the system ends in step 90. If the phone conversation is continuing, the monitored phone conversation of step 70 is compared in step 100 to determine if the conversation is relevant to the system. If the conversation is not relevant to the system, the system continues to monitor the phone conversation in step 70 as indicated above. If the conversation is relevant to the system, the system sends a message typically in the form of an advertisement to the callers in step 110 which accesses the phone system in step 40 to transmit the message to the callers.

Figure 2:
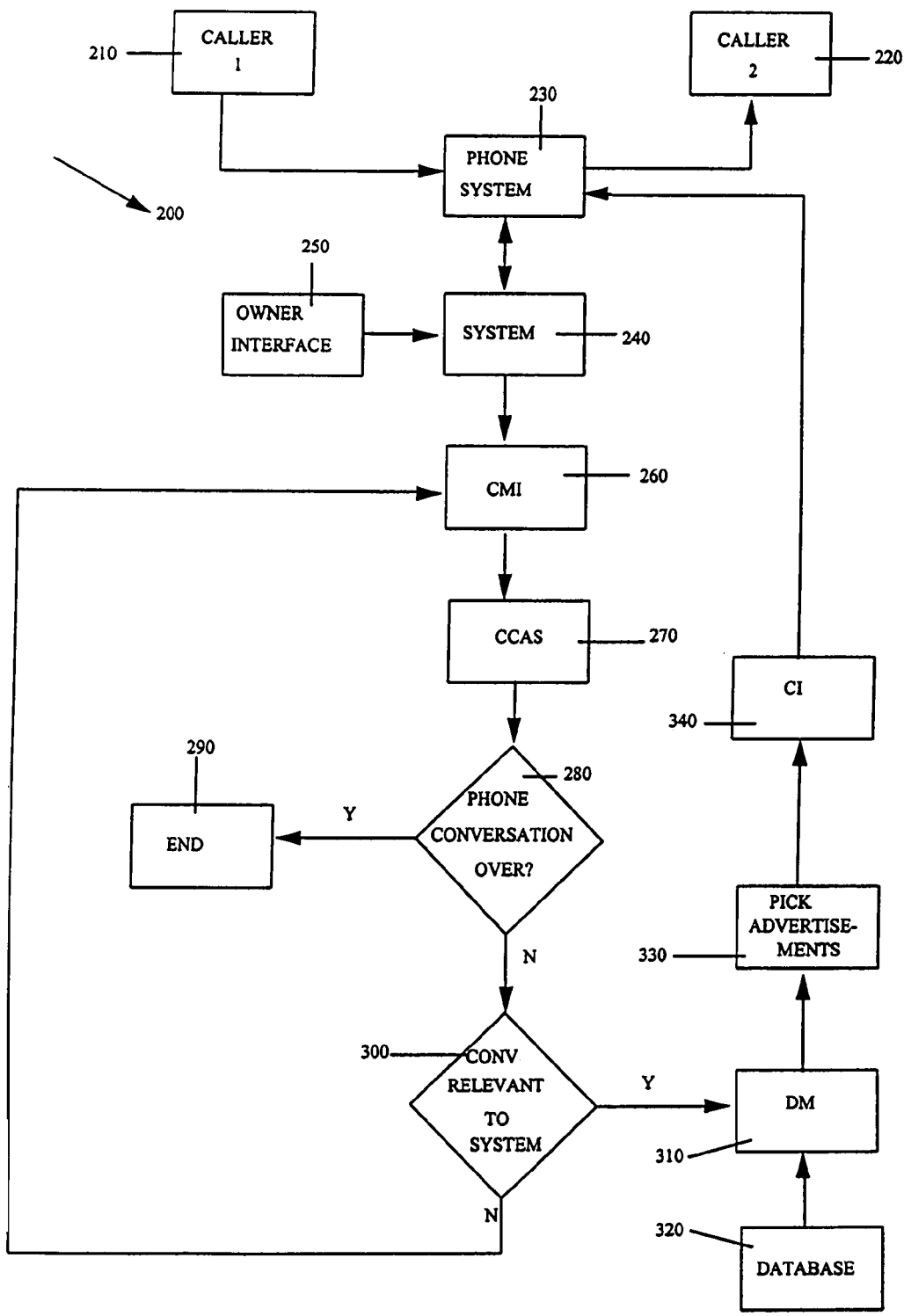
FIG. 2 is a flow diagram of another method and system of the invention.

A preferred method and system of the invention is shown in FIG. 2 generally as 200. In this method and system caller 1 in step 210 will call caller 2 in step 220 using phone system 230. The system 240 interfaces the phone system 230 depending on how the system is configured for use with the caller. For instance, as discussed hereinabove, caller 1 may input a fixed set of digits before dialing the actual phone number for caller 2 which fixed set of digits would interface with system 240. Step 250 shows an owner interface with the system with the owner interface containing the parameters which are desired to be inputted and stored in the system 240. For example, the owner interface would specify to the system key words which would be monitored by the system to determine if the conversation warrants interrupting the conversation to interject an advertising message. In step 260 the communication media interface (CMI) accesses the phone system 230 to interact with the call between caller 1 and caller 2. Step 270 is a conversation content analyzer and summarizer (CCAS) which analyzes and summarizes the content of the conversation between caller 1 and caller 2. Step 280 determines whether the phone conversation is continuing or if it terminated. If the phone conversation is terminated, step 290 ends the system. If the phone conversation is continuing, step 300 compares to determine whether the conversation has relevance to the system. If the conversation is not relevant to the system, the system continues to monitor the phone conversation in step 260. If the phone conversation is relevant to the system, the database manager (DM) in step 310 is used to access the database 320 to determine the message and how the message should be transmitted to the callers. Step 330 shows that the advertisements have been decided and step 340 is a client interface (CI) which communicates the message to the phone system 230 and to the callers 1 and 2.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of interjecting messages into a real-time isochronous discourse between a plurality of users comprising the steps of:
   providing a system for accessing a real-time isochronous discourse on a telephone between two or more callers;
   accessing a real-time isochronous discourse on the telephone between two or more callers;
   monitoring the discourse on the telephone between the callers to determine if the discourse relates to a message desired to be communicated to the callers by the system;
   communicating the desired message via the telephone to the callers when the discourse is determined to be related to the desired message; and
   continuing the above steps until the discourse being accessed is terminated by the callers or the system.

2. The method of claim 1 wherein the real-time isochronous discourse is a telephone call.

3. A method of interjecting messages into a real-time isochronous discourse between a plurality of callers is provided comprising the steps of:
   forming a system comprising:
      a system interface for inputting and storing system parameters by an owner of the system;
      a communication media interface for communicating with a telephone system being used by two or more callers;
      a conversation content analyzer and summarizer for determining if the communication on the telephone system between the callers is relevant to the system parameters;
      a database for storing system data including system messages to be transmitted to the callers;
      a database manager for matching system parameters with the communication on the telephone system between the callers; and
      a caller interface for communicating the system data and/or messages to one or more of the callers;
   accessing the telephone system being used by two or more callers using the communication media interface;
   monitoring the communication on the telephone system between the callers using the communication media interface;
   analyzing the conversation on the telephone system using the conversation content analyzer and summarizer;
   determining if there is a match between the conversation on the telephone system and one or more of the system parameters using the database manager;
   sending the system data from the database to the database manager if there is a match and choosing a suitable message from the database for communication to the callers; and
   transmitting the message via the telephone system to the callers using the caller interface.

4. The method of claim 3 wherein the isochronous discourse is a telephone call.

5. A system for interjecting messages into a real-time isochronous discourse between a plurality of users comprising:
   means for accessing a real-time isochronous discourse on a telephone between two or more callers;

means for monitoring the discourse on the telephone between the callers to determine if the discourse relates to a message desired to be communicated to the callers by the system; and means for communicating the desired message via the telephone to the callers when the discourse is determined to be related to the desired message.

6. The system of claim 5 wherein the isochronous discourse is a telephone call.

7. A system is provided for interjecting messages into a real-time isochronous discourse between a plurality of callers comprising:

means for forming a system comprising:

a system interface for inputting and storing system parameters by the owner of the system;

a communication media interface for communicating with a telephone system being used by two or more callers;

a conversation content analyzer and summarizer for determining if the communication on the telephone system between the callers is relevant to the system parameters;

a database for storing system data including system messages to be transmitted to the callers;

a database manager for matching system parameters with the communication on the telephone system between the callers; and a caller interface for communicating the system data and/or messages to one or more of the callers;

wherein the telephone system being used by two or more callers is accessed using the communication media interface;

the communication on the telephone system between the callers is monitored using the communication media interface;

the conversation on the telephone system is analyzed using the conversation content analyzer and summarizer; and the conversation on the telephone system is compared with one or more of the system parameters using the database manager and, if there is a match, sending the system data from the database to the database manager and choosing a suitable message from the database for communication to the callers and transmitting the message via the telephone system to the callers using the caller interface.

8. The system of claim 7 wherein the isochronous discourse is a telephone call.

9. The system of claim 8 wherein different messages are provided to each caller.

10. A program storage device readable by a machine, tangibly embodying a program of instructions executable by the machine to perform method steps for interjecting messages into a real-time isochronous discourse between a plurality of users comprising the steps of:

providing a system for accessing a real-time isochronous discourse on a telephone between two or more callers;

accessing a real-time isochronous discourse on the telephone between two or more callers;

monitoring the discourse on the telephone between the callers to determine if the discourse relates to a message desired to be communicated to the callers by the system;

communicating the desired message via the telephone to the callers when the discourse is determined to be related to the desired message; and continuing the above steps until the discourse being accessed is terminated by the callers or the system.

11. The program storage device of claim 10 wherein the real-time isochronous discourse is a telephone call.

12. A program storage device readable by a machine, tangibly embodying a program of instructions executable by the machine to perform a method of interjecting messages into a real-time isochronous discourse between a plurality of callers comprising the steps of:

forming a system comprising:

a system interface for inputting and storing system parameters by an owner of the system;

a communication media interface for communicating with a telephone system being used by two or more callers;

a conversation content analyzer and summarizer for determining if the communication on the telephone system between the callers is relevant to the system parameters;

a database for storing system data including system messages to be transmitted to the callers;

a database manager for matching system parameters with the communication on the telephone system between the callers; and a caller interface for communicating the system data and/or messages to one or more of the callers;

accessing the telephone system being used by two or more callers using the communication media interface;

monitoring the communication on the telephone system between the callers using the communication media interface;

analyzing the conversation on the telephone system using the conversation content analyzer and summarizer;

determining if there is a match between the conversation on the telephone system and one or more of the system parameters using the database manager;

sending the system data from the database to the database manager if there is a match and choosing a suitable message from the database for communication to the callers; and transmitting the message via the telephone system to the callers using the caller interface.

13. The program storage device of claim 12 wherein the real-time isochronous discourse is a telephone call.

* * * * *